US006656526B2

United States Patent
Pan

(10) Patent No.: US 6,656,526 B2
(45) Date of Patent: Dec. 2, 2003

(54) POROUSLY COATED OPEN-STRUCTURE SUBSTRATE AND METHOD OF MANUFACTURE THEREOF

(75) Inventor: Alfred I-Tsung Pan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/956,432

(22) Filed: Sep. 20, 2001

(65) Prior Publication Data

US 2003/0054149 A1 Mar. 20, 2003

(51) Int. Cl.$^7$ .............................. B05D 3/02; B05D 5/12; B05D 1/36; B05D 5/00
(52) U.S. Cl. ................... 427/243; 427/376.1; 427/404; 427/419.1; 427/115
(58) Field of Search ................... 427/376.1, 376.2, 427/376.6, 383.3, 404, 419.1, 115, 243, 212

(56) References Cited

U.S. PATENT DOCUMENTS

| 2,267,918 | A | | 12/1941 | Hildabolt |
| 3,359,622 | A | | 12/1967 | Pierre Potet et al. |
| 3,607,433 | A | * | 9/1971 | Isenberg et al. ............. 427/115 |
| 3,650,839 | A | * | 3/1972 | Lang et al. .................... 429/28 |
| 4,043,933 | A | * | 8/1977 | Breault et al. ............... 427/115 |
| 4,446,210 | A | * | 5/1984 | Okada et al. .................. 429/42 |
| 4,847,173 | A | * | 7/1989 | Mitsunaga et al. ........... 429/41 |
| 5,266,177 | A | * | 11/1993 | Watanabe et al. ....... 204/290.11 |
| 5,521,020 | A | * | 5/1996 | Dhar .......................... 427/115 |
| 5,876,867 | A | * | 3/1999 | Itoh et al. ............... 204/290.14 |

FOREIGN PATENT DOCUMENTS

EP 0583773 2/1994

OTHER PUBLICATIONS

Oguri, "Japanese Patent abstract of JP 5–155636 A", Jun. 1993.*

* cited by examiner

Primary Examiner—Michael Barr

(57) ABSTRACT

A method for sintering a porous coating on an open-structure substrate, i.e., a substrate with pre-made pores or openings. The open-structure substrate is spread with a coating paste that is prepared with such a viscosity so that the paste will not drip through the pores/openings on the open-structure substrate. The coating paste is then sintered to form a porous layer on the surface of the open-structure substrate. Optionally, the porous coating may be further coated with a catalyst for fuel cell applications.

2 Claims, 1 Drawing Sheet

POROUSLY COATED OPEN-STRUCTURE SUBSTRATE AND METHOD OF MANUFACTURE THEREOF

TECHNICAL FIELD

The technical field relates to a process for the fabrication of a porous coating on top of an open-structure substrate. The porously coated open-structure substrate is preferably used in fuel cell applications.

BACKGROUND

A fuel cell is an electrochemical apparatus wherein chemical energy generated from a combination of a fuel with an oxidant is converted to electrical energy in the presence of a catalyst. The fuel is fed to an anode, which has a negative polarity, and the oxidant is fed to a cathode, which, conversely, has a positive polarity. The two electrodes are connected within the fuel cell by an electrolyte to transmit protons from the anode to the cathode.

One of the essential requirements of typical fuel cells is the easy access to the catalyst and a large surface area for reaction. This requirement can be satisfied by using an electrode made of an electrically conductive porous substrate that renders the electrode permeable to fluid reactants and products in the fuel cell. To increase the surface area for reaction, the catalyst can also be filled into or deposited onto a porous substrate.

However, these modifications result in a fragile porous electrode that needs additional mechanical support. An alternative is to sinter a porous coating on a solid substrate and then fill or re-coat the porous coating with a catalyst. The substrate can be made of conductive materials or patterned with a conductive material. The porous coating can be made of non-conductive materials, such as ceramics or silicon, or conductive materials such as carbon, ceramic-metal mixture or metals. Typically, the coating material, in the form of fine powders, is mixed with a liquid organic "binder" such as glycol to form a coating mixture. The coating mixture is spread on the substrate and is baked in an oven. The binder is burned off and the coating material is sintered on the substrate to form a porous layer. A catalyst is deposited in the porous layer to provide a large catalytic surface. The substrate is then etched from the backside to create openings so that fuel on the cathode side and oxygen on the anode side can reach the active catalytic surfaces through the openings and the porous layer. The etching process, however, is time consuming and requires specially designed machinery.

SUMMARY

A method for sintering an open-structure substrate with a porous coating is disclosed. The open-structure substrate is a substrate with pre-formed openings (i.e., preformed pores, channels, passageways, etc.), which allow liquids and gases to pass from one side of the substrate to the other side of the substrate. The method is based on the fact that a viscous solution can remain a continuous layer after being applied onto open-structure substrates, such as screens or expanded foils, without dripping through the openings of the substrate.

Briefly, for a chosen open-structure substrate, a coating paste is prepared by mixing a solid coating material with a liquid binder. The coating material and the binder is mixed at a ratio such that the viscosity of the paste is high enough to prevent the paste from dripping through the openings on the substrate. The paste is spread on the surface of the open-structure substrate, and is subjected to a heating process to remove the binder and to sinter the coating material on the surface of the open-structure substrate to form a porous coating. Since the openings on the substrate are pre-formed before the coating process, this method eliminates the expensive and time-consuming etching step after the sintering. The method can be used to manufacture electrodes for fuel cells or any other applications which require a porous coating on an open-structure substrate.

In an embodiment, the paste comprises fine metal powders, such as zinc or silver powders, a viscous binder, such as glycol, and, optionally, a flux. A flux is a reducing agent that serves to remove the oxidized surface layer of metal particles.

In another embodiment, the porous coating on the open-structure substrate may be further coated with a catalyst.

In yet another embodiment, the paste may be prepared in the form of a solgel. A solgel is prepared by peptizing a coating material, such as silicon oxide or metal oxide, with water or a water-miscible alcohol, such as methanol, ethanol, isopropanol, ethylene glycol and the like, to form a viscous polymeric sol. The viscous polymeric sol is heated at a relatively low temperature (usually less than 100° C.) to form a heat-set gel. The heat-set gel is then heated in the presence of oxygen at a temperature and for a period of time sufficient to oxidize and volatilize any remaining vapors and organic materials from the gel to form a solid porous product.

BRIEF DESCRIPTION OF THE DRAWINGS

The detailed description will refer to the following drawings, in which like numerals refer to like elements, and in which.

DETAILED DESCRIPTION

Figure 1:
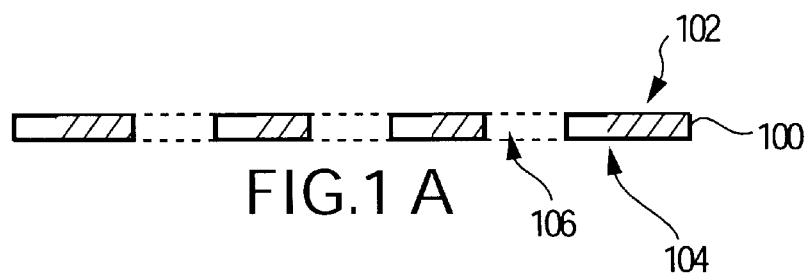
FIG. 1A depicts an open-structure substrate.
FIG. 1B depicts an open-structure substrate covered with a paste.
FIG. 1C depicts an open-structure substrate with sintered porous coating.
FIG. 1D depicts a porous coated open-structure substrate with optional catalyst coating.
Figure 1:
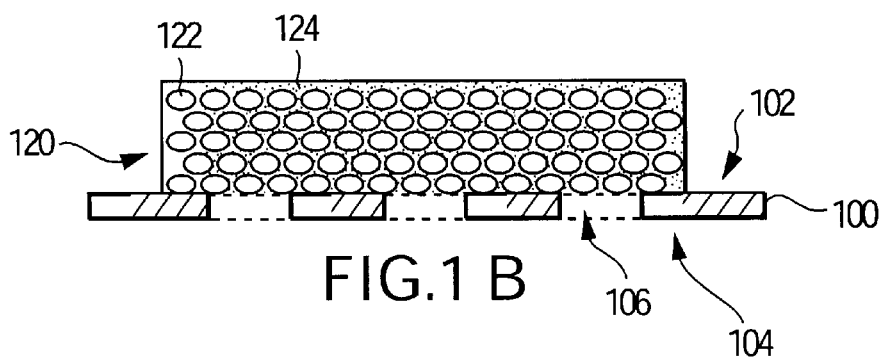
Figure 1:
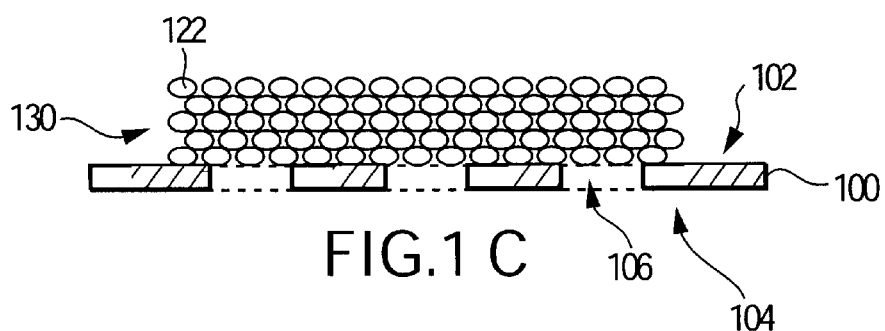
Figure 1:
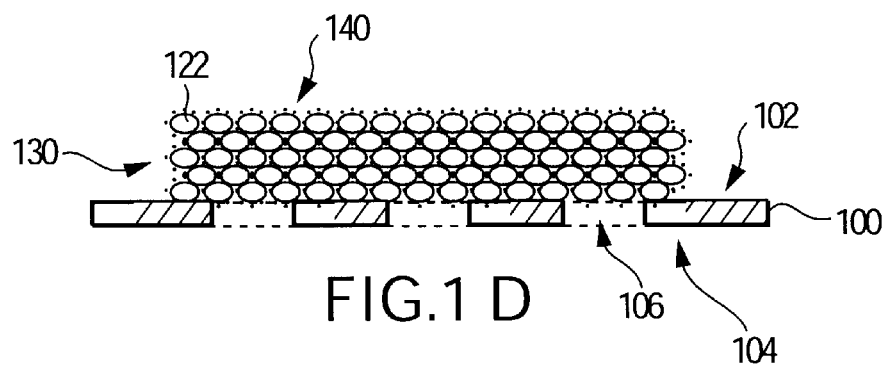

FIG. 1A shows an open-structure substrate 100 having an upper surface 102, a lower surface 104, and a plurality of openings 106. The number and size of the openings 106 can be variable, so long as they provide enough permeability so that the liquid on one side of the substrate may reach the other side in sufficient quantities. The substrate 100 may be made of conductive materials, such as metal, carbon, metal-ceramic mixture, or non-conductive materials, such as glass, ceramic, flex material such as Kapton (Dupont) or Upilex (Ube), for example. A non-conductive substrate 100 may be patterned with a conductive material (not shown in the figure) for certain electrical applications.

FIG. 1B shows the open-structure substrate 100 covered with a coating paste 120. The coating paste 120 comprises a coating material 122 and a binder 124. The coating material 122 may be in the form of fine particles. The diameters of the particles may vary depending on the desired porosity of the porous coating. In general, smaller particles lead to smaller pores and a larger surface area, while larger particles result in larger pores and a smaller surface area. The coating material may be carbon particles, glass beads, silicon powder, ceramic powder, metal particles, or any other material or a mixture of materials that may form a porous layer after a sintering process. Nonconductive coating materials, such as silicon or ceramic, may be pre-coated with a thin layer of conductive material, such as zinc, before sintering so that the final coating would be conductive.

Metals that are used for the porous coating are not limited to specific kinds. The following substances may be preferably used: Ni, Cu, Al, Fe, Zn, In, Ti, Pb, V, Cr, Co, Sn, Au, Sb, Ca, Mo, Rh, Mn, B, Si, Ge, Se, La, Ga and Ir. Each metal listed above may be used in the form of oxide and sulfide thereof and a simple substance or a mixture, including compounds of these metals. The metals may be used in a powder form to increase the surface area. The peripheral surfaces of the metal powders are desired not to be convex or concave so that they do not intertwine one another. Thus, the metal powders are preferably spherical, dice-shaped, square piller and columner.

The temperature for sintering a metal powder should be high enough to partially melt the metal particles in order to form a sintered porous metal layer. However, overheating may completely melt the metal particles and destroy the porosity of the sintered layer. To prevent the overheating, metal particles (hereafter defined as "core particles") may be pre-coated with a thin layer of a cover metal with a lower melting temperature. For example, copper core particles may be coated with a cover layer of zinc. The coated core particles are then sintered at the melting temperature of the cover metal. Since the melting temperature of the cover metal is lower than the melting temperature of the core metal, the core particles will not melt and will maintain the porosity of the layer after the sintering process. A similar method may also be used for sintering non-conductive coating materials (hereafter defined as "non-conductive core particles"). In this case, the non-conductive core particles may be pre-coated with a layer of cover material having a melting temperature lower than that of the core particles, and sintered at the melting temperature of the cover material.

The binder 124 may be glycol, wax, a solvent, or any other viscous liquid that is evaporable during the sintering process.

The binder 124 and the coating material 122 are mixed at a ratio that results in a paste 120 with a viscosity high enough to prevent the paste 120 from dripping through the openings 106 on the substrate 100.

The paste 120 is then applied to the upper surface 102 of the open-structure substrate 100 to form a pre-sintering coating. If the open-structure substrate 100 is patterned with a conductive layer, the paste 120 may be screen printed on the open-structure substrate 100 so that the location and shape of the sintered porous coating can conform to the patterned conductive layer.

If the coating material is metal particles, a reducing agent, called a flux, may be added to the paste to remove oxidized surface layer of the metal particles so that the particles can melt to each other during the sintering process. The choice of flux is dependent on the type of metal that needs the treatment.

The next step is to bake the paste 120 in an oven to dry out the binder 124. As shown in FIG. 1C, the coating material 122 is sintered and forms a porous coating 130 on the surface of the open-structure substrate 100 after the baking process.

The baking conditions, i.e., baking time and temperature, may vary depending on the coating material 122 and the binder 124. For metallic coating materials, the paste 120 is preferably baked under a condition that partially melts the metal particles in order to form a layer of porous metal.

FIG. 1D shows an optional step of further depositing a layer of catalytic coating 140 on the porous coating 130. Referring to the composition of catalytic coating for fuel cells using methanol, catalytic materials such as Pt—Ru and Pt—Ru—Os, are found to be effective in converting methanol to protons without poisoning other fuel cell constituents. If the porous coating 130 is made of conductive materials, the catalyst may be deposited onto the porous coating 130 by electroplating, electroless plating, atomic layer deposition, or any other process that is capable of coating the surface of a conductive porous layer. In this case, the porous coating 130 may function as a current collector. If the porous coating 130 is made of non-conductive materials, a conductive material may be deposited onto the surface of the non-conductive porous coating 130 by electroless plating, atomic layer deposition, or any other process that is capable of coating the surface of a non-conductive porous layer. The catalyst 140 is then deposited onto the conductive material by electroplating, electroless plating, atomic layer deposition, or any other process that is capable of coating the surface of a conductive porous layer. Alternatively, the non-conductive porous coating 130 may be directly coated with the catalyst 140 by atomic layer deposition, or any other process that is capable of coating the surface of a non-conductive porous layer.

Although preferred embodiments and their advantages have been described in detail, various changes, substitutions and alterations can be made herein without departing from the spirit and scope of the sintering process as defined by the appended claims and their equivalents.

What is claimed is:

1. A method for sintering a porous coating on an open-structure substrate comprising the steps of:

selecting an open-structure substrate with openings of desired sizes, said open-structure substrate having a first side and a second side;

admixing a coating material with a binder to form a paste having a viscosity high enough to prevent said paste from dripping through the openings on the open-structure substrate, wherein the coating material is non-conductive;

applying the paste to the first side of said open-structure substrate to form a paste layer of a desired thickness;

heating the paste layer at a sintering temperature for a period of time to form a porous coating on the open-structure substrate;

pre-coating the non-conductive coating material with a conductive material by electroless plating or atomic layer deposition; and depositing a catalyst on the pre-coated non-conductive coating material by electroplating, electroless plating, or atomic layer deposition.

2. A method for sintering a porous coating on an open-structure substrate comprising the steps of:

selecting an open-structure substrate with openings of desired sizes, said open-structure substrate having a first side and a second side;

admixing a coating material with a binder to form a paste having a viscosity high enough to prevent said paste from dripping through the openings on the open-structure substrate, wherein the coating material comprises a core particle coated with a cover layer, wherein the core particle and the cover layer each has a melting temperature, and wherein the melting temperature of the cover layer is lower than the melting temperature of the core particle;

applying the paste to the first side of said open-structure substrate to form a paste layer of a desired thickness; and heating the paste layer at a sintering temperature for a period of time to form a porous coating on the open-structure substrate, wherein the sintering temperature is higher than the melting temperature of the cover layer but lower than the melting temperature of the core particle.

\* \* \* \* \*